(No Model.)

J. KREISCHER.
METHOD OF AND MACHINE FOR CREAMING CANDY.

No. 282,535. Patented Aug. 7, 1883.

Witnesses:
S. B. Brewer
C. A. Hamlin

Inventor:
Jacob Kreischer,
by William N. Low,
Attorney.

UNITED STATES PATENT OFFICE.

JACOB KREISCHER, OF ALBANY, NEW YORK.

METHOD OF AND MACHINE FOR CREAMING CANDY.

SPECIFICATION forming part of Letters Patent No. 282,535, dated August 7, 1883.

Application filed June 26, 1883. (No model.)

*To all whom it may concern:*

Be it known that I, JACOB KREISCHER, of the city and county of Albany, in the State of New York, have invented certain new and useful Improvements in the Method of and Machinery for Creaming Candy, of which the following is a specification.

My invention relates to improvements in the mode of creaming candy and to the machinery for effecting the same; and the object of my invention is to effect the operation of creaming candy in a much more expeditious and perfect manner than it has ever before been accomplished, and to provide suitable machinery to effect that purpose. This object I attain by means of the mechanism illustrated in the accompanying drawings, which form part of this specification, and in which—

Figure 1:
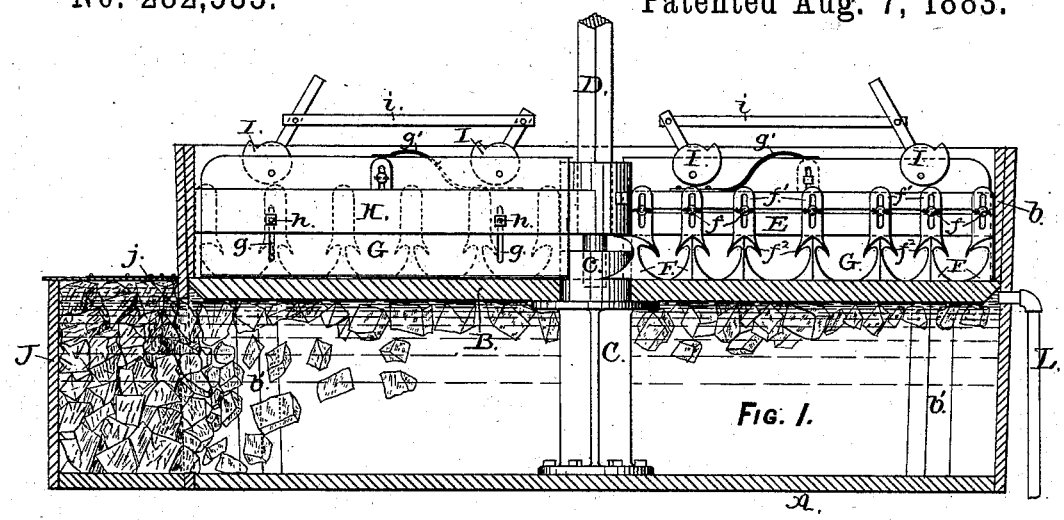
Figure 2:
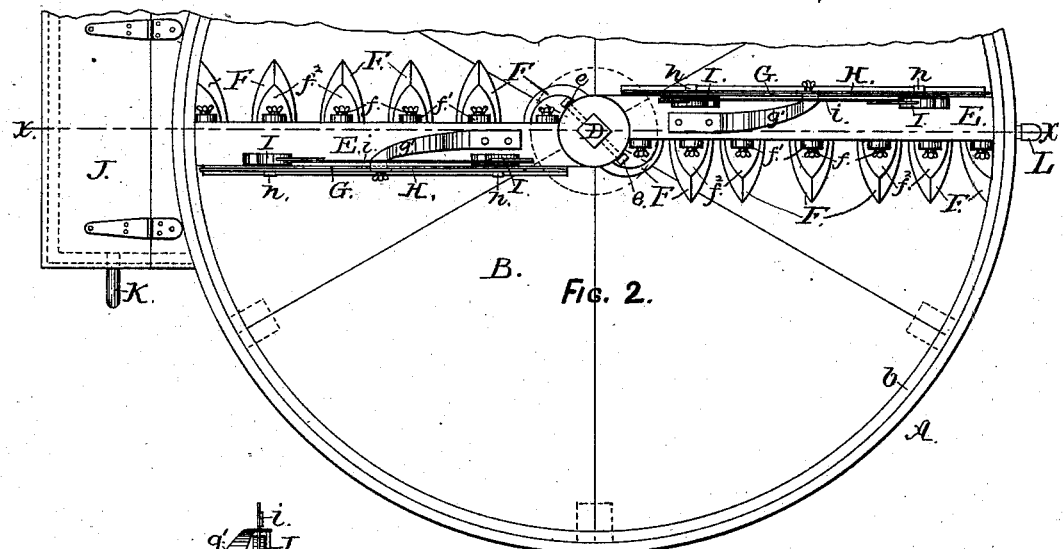
Figure 4:
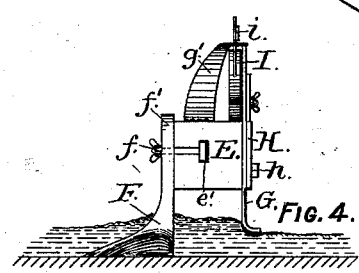
Figure 3:
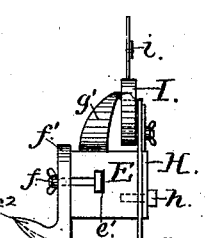

Figure 1 is a vertical section, at the line $x\ x$ on Fig. 2, of a machine embodying my invention; Fig. 2, a plan view of part of the same; Fig. 3, an end view of one of the arms or sweeps, showing one of the points and striking-sweep in position when there is no candy in the machine. Fig. 4, a like view showing a mixing-point and striking-sweep in position while performing their functions in creaming candy; and Fig. 5 a horizontal section, at the line $y\ y$ on Fig. 3, of one of the mixing-points.

As heretofore practiced the operation of creaming candy has been accomplished by manual labor exclusively and in the following manner: A batch of melted candy is first poured upon a marble or stone slab and permitted to remain until it cools down under the influence of the surrounding atmosphere. When the mass is partially cooled, or when nearly crystallized, operatives with paddle-shaped implements begin to break it up by first turning over the edges of the mass, in a manner very similar to the operation of spading earth, and then the balance of the mass is treated in the same way, and the operation must be continued until a complete disintegration of the crystals is effected and the candy is reduced to a creamy condition. The operation is of necessity a very slow and laborious one, and for that reason the operatives frequently neglect to carry it to that degree that is required to effect it in a complete and thorough manner.

In my improved mode the batch of melted candy is thrown upon a marble or stone bed contained in a tank or cistern through which a current of water cooled by ice or any of the well-known freezing-mixtures is kept constantly flowing in contact with the under side of said bed, so as to maintain the latter in a cold condition, whereby the mass is rapidly cooled down and reduced to a crystalline state. Then by mechanical means, as hereinafter described, the mass is quickly and thoroughly broken up and reduced to a proper creamy consistency, and the operation is completed in from one-half to one-fourth of the time required for effecting it by the manual method heretofore practiced.

As represented in the drawings, A is the tank of the machine, made in circular form, and having a disk or bed, B, of marble or other stone, secured within it nearly at its top, so as to leave a curb, $b$, around said bed. The joints of said bed require to be made perfectly water-tight in order to prevent the water beneath it from leaking through and injuring the candy. The center of the bed B is supported by a standard, C, whose upper end is utilized as a step, $c$, for the vertical shaft D; and the periphery of said bed is supported by means of the studs $b'$, or in any other suitable manner. The under edge of the periphery of the bed B should be chamfered or beveled off, as shown in Fig. 1, so as to permit the flow of water to be kept at a height that will accord with the mid-thickness, or thereabout, of said bed.

The vertical shaft D is preferably made square, and may receive its required rotatory motion by means of gear-wheels or pulleys that are actuated by any suitable motive power.

Near the lower end of the shaft D a transverse double arm or sweep, E, is adjustably secured thereto by means of set-bolts $e$, in such manner that the position of said arm in respect to its height from the face of the bed B can be adjusted to suit the various thicknesses of the different masses of candy that are placed on said bed. The arm E, which extends entirely across the diameter of the curb $b$, is provided with T-shaped openings $e'$, which extend lengthwise in each limb of said arm, and are arranged so that they are open on the advancing face of each limb.

Figure 5:
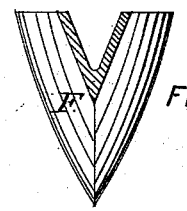

Points or shares F, whose form closely resemble the teeth of a cultivator used for agricultural purposes, are secured by means of bolts $f$, which are inserted in the opening $e'$, to the arm E, so that they will project from the advancing face of each limb of said arm. The said points are each provided with a vertically-slotted flange, $f'$, through which the binding-bolts $f$ pass, so as to permit the said points to be adjusted to fairly clear the face of the bed B. The series of points F that are secured to one limb of the arm E are faced in a contrary direction to the series on the opposite limb, as shown in Fig. 2, the arrangement being such that as the arm E is rotated each series of said points will be on the foremost face of the limb to which it is attached. The points F are also arranged so that those of one series will occupy positions that accord with the blank spaces between the points of the opposite series, so that with each revolution of the shaft D the entire surface of the bed B will be passed over by the said points. The working-faces of the points F are formed, as shown in Fig. 5, in such manner that they will turn over and break up the crystals of the partially-cooled mass of candy in a manner that is closely similar to the action of a cultivator-machine upon soil.

The points F, I preferably make with downwardly-curved flanges $f^2$, as shown in Fig. 1. The said flanges are formed directly above the lower angled faces of the points for the purpose of turning the candy over upon itself and effecting the rupture of the crystals in a more perfect manner. The points F that are placed next to the step $c$ should be made to curve around said step, and their angled faces arranged so as to push the candy outwardly away from the center of the bed; and those that are fixed next to the curb $b$ should have their outer sides cut away, as shown in Fig. 2, and their angled faces should be so arranged that they will move the candy away from said curb and push it inwardly toward the center of the bed B.

On the back of each limb of the arm E there is fixed a striking-sweep, G, which follows directly after the points F, and smooths down the furrows made by said points and spreads the candy in an even thickness over the bed B. By their action the said striking-sweeps cooperate with the points F in reducing the mass of candy to a creamy condition. The lower edges of said striking-sweeps are bent rearwardly to effect the smoothing down of the mass in a more perfect and effective manner.

The striking-sweeps G are held between the limbs of the arm E and guard-plate H. The latter is secured to said arm by means of the bolts $h$, which pass through slotted openings $g$, formed in the sweeps G, in such manner that the said sweeps can be raised and lowered to adjust them to the different thicknesses of the masses of candy placed on the bed B. The sweeps G are forced downward by springs $g'$, secured to the arm E and bearing upon the upper edges of said sweeps. A pair of eccentric cams, I, are pivoted to each of the sweeps G, and are connected together by the rods $i$, so as to be moved in unison. The said cams are arranged to bear upon the upper side of the arm E in such manner that when they are turned upon their pivotal centers they will force the said sweeps to rise up against the resistance of the springs $g'$.

A chamber, J, is formed on one side of the tank A for facilitating the introduction of a supply of ice or any freezing-mixture underneath the bed B, as occasion requires. An opening, $j$, forms a communication between said chamber and the space in the tank beneath the bed B, and through said opening the cooling material may be pushed into the tank, where it will float against the under side of the bed B and hasten the cooling down of the mass of candy lying on said bed.

Water is admitted to the tank A through the supply-pipe K, and the water that has become warmed by its contact with the bed B is carried away through the waste-pipe L, the latter being so arranged that it will permit the water to be maintained at a level whose line is at the mid-thickness of the bed B.

When preferred, the points F may be made without the curved flanges $f$; but my experience teaches me to believe that said points are more effective when provided with such flanges; and while I prefer said points when constructed with the curved flanges, as first described herein, I desire to have it understood that the scope of my invention includes their construction without such flanges.

I claim as my invention—

1. The method herein described for creaming candy, which consists in first placing the mass of melted candy upon a bed cooled by artificial means, and after the mass has become partially cooled down on said bed then kneading it by mechanical means, substantially as herein specified.

2. In a candy-creaming machine, the combination, with a tank containing a cooling-bed, and provided with means for maintaining a body or current of cooling-fluid beneath said bed, of mechanism, substantially as described, for continuously kneading a batch of candy until the same is reduced to a creamy consistency, as herein specified.

3. The combination, with a tank, A, provided with a cooling-bed, B, as herein described, of the rotatable arm or sweep E, provided with points F, adapted to continuously turn over and knead a batch of candy placed upon the bed B, so as to effect the creaming of said batch, in the manner herein specified.

4. The combination, with the rotatable arm or sweep E, provided with the kneading-points F, substantially as described, of the striking-sweeps G, attached to the arm E, and adapted to level down a batch of candy, as and for the purpose specified.

JACOB KREISCHER.

Witnesses:
WM. H. LOW,
S. B. BREWER.